March 27, 1962     W. T. EVANS     3,027,085
SEISMIC ELEVATION AND WEATHERING TIME CORRECTION COMPUTER
Filed July 29, 1955     4 Sheets-Sheet 1

*INVENTOR.*
WILLIAM T. EVANS
BY
ATTORNEYS

INVENTOR.
WILLIAM T. EVANS

United States Patent Office 3,027,085
Patented Mar. 27, 1962

3,027,085
SEISMIC ELEVATION AND WEATHERING TIME CORRECTION COMPUTER
William T. Evans, Beaumont, Tex., assignor to Sun Oil Company, Philadelphia, Pa., a corporation of New Jersey
Filed July 29, 1955, Ser. No. 525,280
4 Claims. (Cl. 235—193)

This invention relates to analog computers and, more particularly, to an analog computer for use in computing seismic elevation and weathering time corrections.

It is well known in the art of seismic surveying, in working with seismic records, that it is necessary to make numerous time corrections in the records. Among these time corrections are a time correction to compensate for conditions of the weathered layer of the surface of the earth and a time correction to compensate for variations in elevation of various detectors employed. These computations require considerable time when done by numerical methods.

It is an object of this invention to provide an analog computer capable of solving an equation which is hereinafter set forth, a solution of which provides the desired weathering time correction and elevation time correction.

It is a further object of the invention to provide an analog computer for solving for the time corrections noted in which settings of the computer relating to velocity, distance or time conditions can be changed independently of each other.

These and other objects of the invention will become apparent from the following description when read in conjunction with the accompanying drawings, in which.

The analog computer is designed to solve an equation which provides the desired weathering time correction in milliseconds. It is believed unnecessary to set forth the derivation of this equation. For purposes of this invention it is sufficient that this equation be set forth as an example of the type of equation that can be solved by the computer. It will be evident that the computer is not limited in its application to the solution of this one equation only; the principles set forth have application in computer circuits in which variables are involved in a relationship $$I = \frac{E}{R}$$

and in which the I's are to be algebraically summed.

Figure 1:
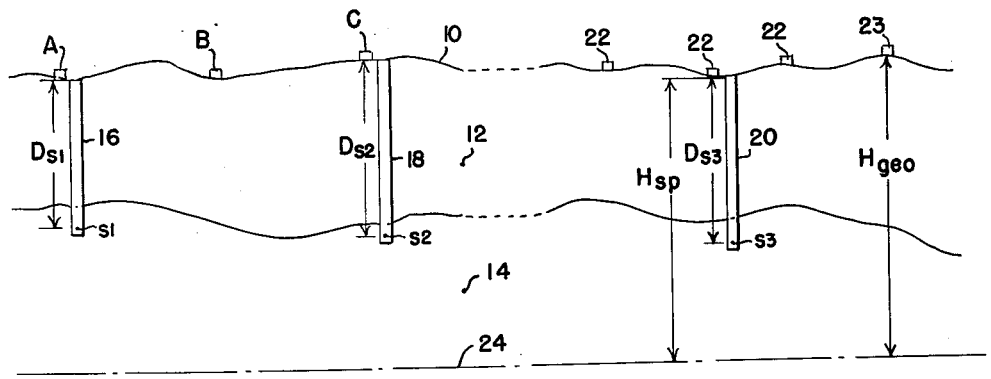
FIGURE 1 is a section through the surface of the earth showing shot holes and detectors to which reference will be made in the weathering correction equation.

Reference to FIGURE 1 will make clear in a general way the various terms in the equation to be solved. In FIGURE 1 there is indicated the surface of the earth 10 depicting in exaggerated form variations in elevation of the surface. Below the surface of the earth there exists the weathered layer 12 which is a shallow zone near the earth's surface in which seismic velocities are abnormally low. The layer 14 is the higher velocity zone lying below the weathered layer 12. Through the first layer and into the second layer are bored spaced holes 16, 18 and 20. The holes need not be of identical depth below the surface of the earth or below the boundary between the layers 12 and 14, the essential consideration being that the bottoms of the holes are below the weathered layer 12. In the bottoms of these holes are placed explosive charges indicated as $S_1$, $S_2$ and $S_3$, respectively.

Two detectors indicated at A and C are positioned at the surface of the earth adjacent to the tops of the holes 16 and 18, respectively. A third detector B is positioned between the detectors A and C. Additional detectors 22 and 23 are shown placed in the vicinity of the top of hole 20. It will be evident hereinafter that these additional detectors may be arranged around any of the bore holes shown. The object of the computation is to determine the corrections to be applied to the times of events associated with the recorded traces taken from each of the detectors 22 and 23 to make that detector appear to be positioned in a datum plane with no intervening weathered layer between the detector and the subsurface strata from which seismic reflections are received and to make the shot appear to originate from the datum plane. Such a datum plane is shown at 24 in FIGURE 1. It will be evident that the precise location of the datum plane is entirely arbitrary, the essential considerations being that some convenient and preferably horizontal datum plane be established to which the record traces taken from each of the detectors 22 and 23 may be related.

The depth of shot $S_1$ below the detector A at the surface of the earth is $D_{s1}$. The depth of shot $S_2$ below the detector C at the surface of the earth adjacent to the hole 18 is $D_{s2}$. The depth of the shot $S_3$ below the surface of the earth at the top of bore hole 20 is $D_{s3}$. The height of the top of the bore hole 20 above the datum plane 24 is $H_{sp}$. The height of detector 23 above the datum plane 24 is $H_{geo}$. In this instance, data is provided for correcting the records obtained at the detector 23.

The total correction to be made is the weathering correction plus the elevation correction. The equation for this total correction is:

$$Tt = T_{wx} + \frac{(-T_{wx})(V_1) + D_{s3} - H_{geo} - H_{sp}}{V_2} \quad (1)$$

where $T_{wx}$ is the total weathering correction. The equation for the weathering correction is:

$$4T_{wx} = T_{ac} + T_{ca} + \frac{D_{s1} + D_{s2}}{V_2 - V_1} - 2(T_{ab} + T_{cb})$$

$$- \frac{V_2(T_{up1} + T_{up2})}{V_2 - V_1} \quad (2)$$

where:

$T_t$ is the total weathering and elevation correction in milliseconds;
$T_{wx}$ is the desired weathering correction in milliseconds;
$V_1$ is the velocity of wave propagation through the weathered layer 12;
$V_2$ is the velocity of wave propagation through the high velocity unweathered layer 14;
$D_{s1}$, $D_{s2}$ and $D_{s3}$ are shot depths as noted above;
$H_{sp}$ and $H_{geo}$ are elevations above datum as noted above;
$T_{ab}$ is the travel time in milliseconds of waves from the shot point $S_1$ to the detector B;
$T_{cb}$ is the travel time in milliseconds of waves from the shot point $S_2$ to the detector B;
$T_{ac}$ is the travel time in milliseconds of waves from the shot point $S_1$ to the detector C;
$T_{ca}$ is the travel time in milliseconds of waves from the shot point $S_2$ to the detector A;
$T_{up1}$ is the up-hole wave travel time in milliseconds in hole 16;
$T_{up2}$ is the up-hole travel time in milliseconds in hole 18.

For purposes of computation by means of the analog computer, Equation 2 is rewritten as:

$$T_{wx} = \frac{T_{ac}}{4} + \frac{T_{ca}}{4} - \frac{T_{ab}}{2} - \frac{T_{cb}}{2} - \frac{T_{up1} + T_{up2}}{4} + \frac{D_{s1} + D_{s2} - V_1(T_{up1} + T_{up2})}{4(V_2 - V_1)} \quad (3)$$

It will be evident that each of the terms of the Equations 1–3 include time values and thus an analog may be established employing current for time, resistance for velocity and voltage for distance.

Figure 2:
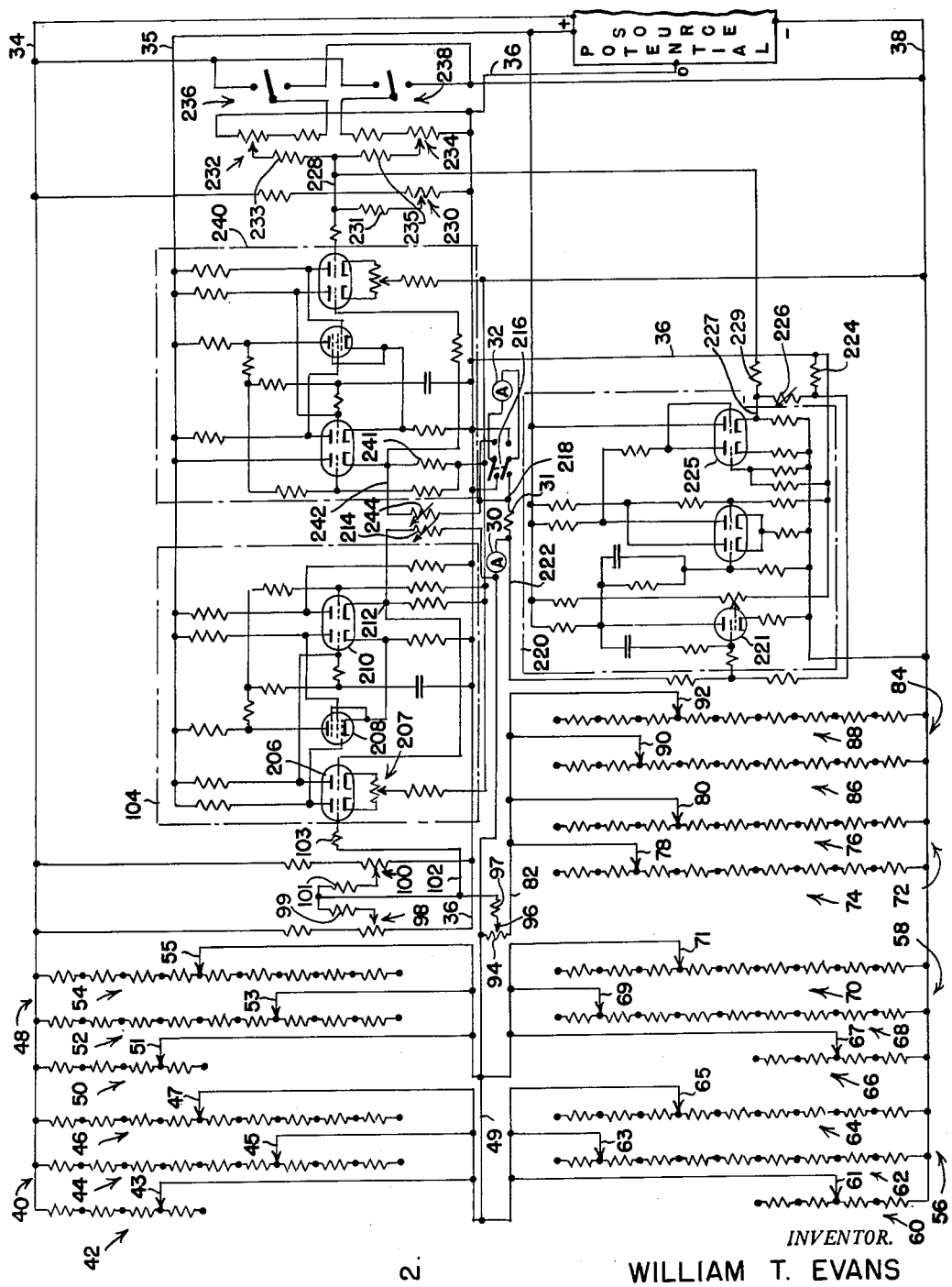
FIGURE 2 is a circuit diagram of the computer.
Figure 5:
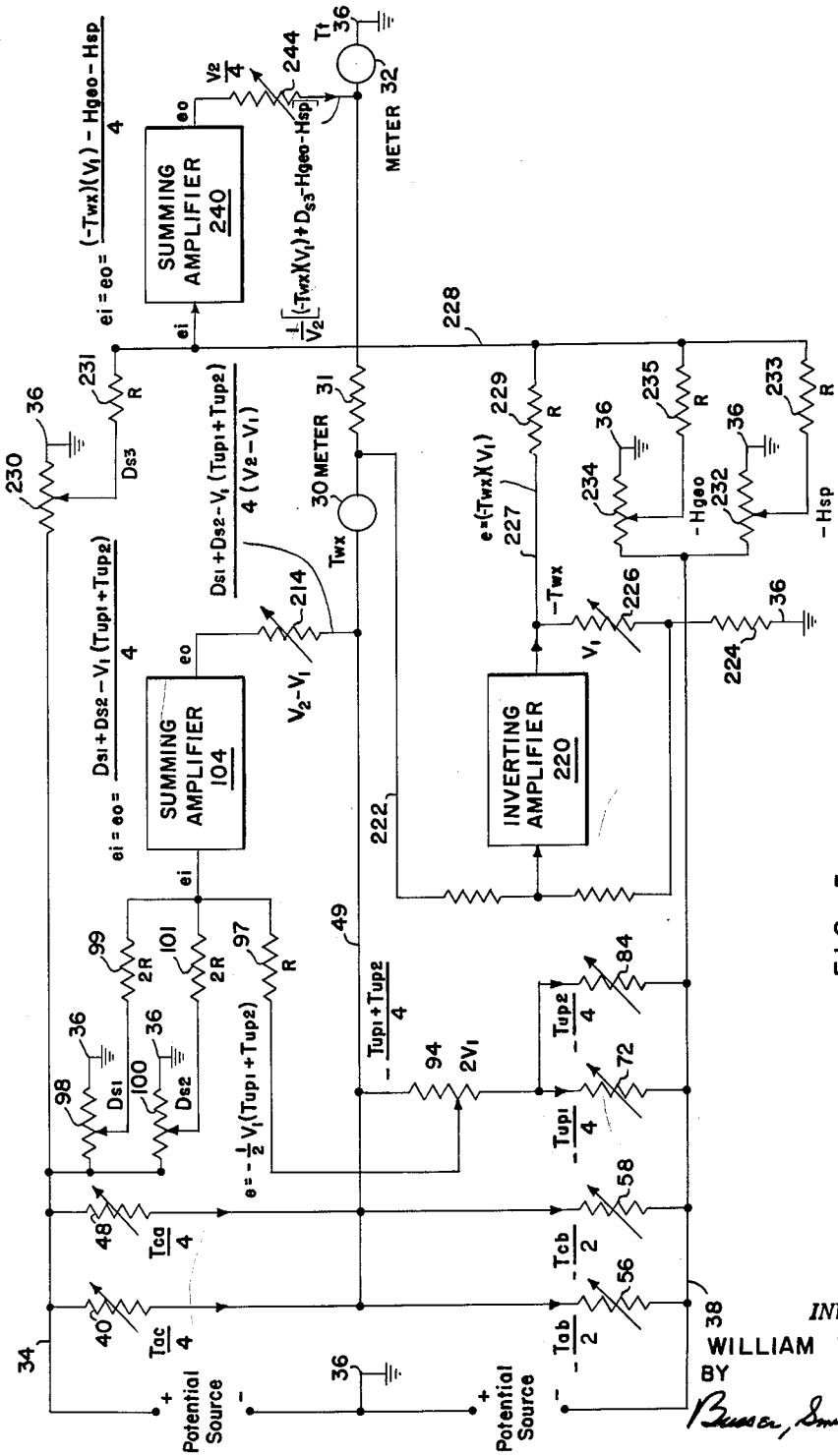
FIGURE 5 is a block functional diagram of the computer.

The circuit diagram of the computing instrument is shown in FIGURE 2, and, to facilitate an understanding of the same, a block functional diagram is shown in FIGURE 5. The circuit diagram includes two milliammeters 30 and 32 and conductors 34, 36 and 38 which are connected to a suitable source of positive, neutral and negative potential, respectively. As will be hereinafter described in greater detail, the current flowing through the milliammeter 30 is indicative of the desired weathering correction and represents an algebraic summation of currents passing from the positive and negative conductors 34 and 38, respectively, through various legs of the computer to the milliammeter 30. The current passing through the milliammeter 32 is indicative of the total time correction and represents an algebraic summation of the current passing through the milliammeter 30 and currents passing through various other legs of the computer circuit from the conductors 34 and 38.

The first leg of the computer, which is analogous to the expression $T_{ac}$ of Equation 3, is indicated generally at 40 in FIGURE 2 and consists of three parallel branches indicated generally at 42, 44 and 46 each of which is made up of a plurality of fixed resistors connected in series. Junctions between successive resistors in each of the parallel branches are brought out to terminals of a rotary selector switch as will be hereinafter described in connection with FIGURE 3. The selector switch arms are indicated at 43, 45 and 47 and are connected through conductor 49 to the milliammeter 30. The parallel branch indicated at 42 is used to set time in tenths of a second. The parallel branch indicated at 44 is used to set the time in hundredths of a second. The parallel branch indicated at 46 is used to set the time in thousandths of a second. It will be evident that this arrangement avoids the use of non-linear potentiometers and provides for the setting of time values in terms of flow of current in milliamperes by the setting of calibrated dials. By properly selecting the values of successive resistors, the dials may be linearly calibrated.

The leg $T_{ca}$ is indicated generally at 48 in FIGURE 2 and consists of three parallel branches indicated generally at 50, 52 and 54. These branches are identical to the branches 42, 44 and 46, respectively, of the $T_{ac}$ network indicated at 40 and are connected through selector arms 51, 53 and 55 and the conductor 49 to the milliammeter 30.

The legs $T_{ac}$ and $T_{ca}$ are both positive and are thus connected to the positive supply conductor 34. The $T_{ab}$ and $T_{cb}$ legs are indicated generally at 56 and 58. These legs are negative and are thus connected to the negative potential conductor 38. The $T_{ab}$ leg consists of three parallel branches 60, 62 and 64 connected to conductor 49 through selector switches 61, 63 and 65, respectively. The $T_{cb}$ leg 58 consists of three parallel branches 66, 68 and 70 connected to the conductor 49 through selector switches 67, 69 and 71, respectively. The $T_{ab}$ and $T_{cb}$ legs shown at 56 and 58 are similar to the legs 40 and 48 with the exception that the legs 40 and 48 include a factor of one-quarter, whereas the negative legs 56 and 58 include a factor of one-half and thus the resistance values employed in each of the individual resistors of each of the parallel branches will have a value one-half that of the corresponding resistors in the legs 40 and 48.

The legs indicated generally at 72 and 84 in FIGURE 2 represent the $T_{up1}$ and the $T_{up2}$ legs, respectively. The leg 72 consists of two parallel branches indicated generally at 74 and 76 made up of fixed resistors in series and having selector switches 78 and 80, respectively, for selecting junctions between successive resistors for connection to a conductor 82. The $T_{up2}$ leg indicated at 84 consists of two parallel branches indicated at 86 and 88 which are also made up of fixed resistors in series and provided with selector switches 90 and 92, respectively, also connected to the conductor 82.

From the equation it will be evident that the values $T_{up1}$ and $T_{up2}$ are negative and thus these legs are connected to the negative potential conductor 38. These two legs each include only two decades and have a factor of one-quarter. Thus the resistance values of the individual resistors in each of the parallel branches are selected accordingly.

The algebraic summation of the currents flowing through the various branches of the legs 72 and 84 pass through the winding of a potentiometer 94 and through the conductor 49 to the milliammeter 30. The potentiometer 94 is analogous to the value $2V_1$. This potentiometer is employed in order to provide a voltage equal to $\frac{1}{2} V_1(T_{up1} + T_{up2})$ at the potentiometer slider. To compensate for this, the final resistor in each of the parallel branches is decreased by twice the value of the potentiometer winding. This introduces a variable error in the current depending upon the settings of the selector switches. For most settings, the difference between the actual current and the current indicated by the switch settings is insignificant. Thus the first five terms of Equation 3 are accommodated and the last term of Equation 3 may now be considered.

A voltage corresponding to $-\frac{1}{2}V_1(T_{up1} + T_{up2})$ is taken at the slider 96 of the potentiometer 94. Voltages representative of the $D_{s1}$ and $D_{s2}$ values of this term of the equation are taken from voltage dividers 98 and 100, respectively, connected between the positive potential conductor 34 and the neutral conductor 36. These two voltages and the voltage taken from the potentiometer 94 are connected through resistors 99, 101 and 97, respectively, and through conductor 102 and a resistor 103 to a summing amplifier shown within the outline 104. This input voltage will be approximately equal to $\frac{1}{4}[D_{s1} + D_{s2} - V_1(T_{up1} + T_{up2})]$. The derivation of this expression can be shown mathematically. However, it is believed unnecessary to burden this disclosure with derivations of this type for the reason that the invention relates particularly to the analog computer and not to the derivation of equations and expressions which are solved by means of the computer.

The summing amplifier 104 employs a direct-coupled differential input feedback circuit of the type described in Valley, G. E., and Wallman, H., "Vacuum Tube Amplifiers," Rad. Lab. Series, vol. 18, page 480, McGraw-Hill, New York, 1948. The input to the amplifier is to the left-hand grid of a high mu twin triode 206 which has a common cathode connection as indicated at 207. The differential output between the plates of tube 206 is fed to the grid and cathode of pentode 208, the cathode feed being through the left-hand triode of the twin triode tube 210 operating as a cathode follower. The output from the plate of the pentode 208 is delivered to the grid of the right-hand triode of tube 210, which is also operated as a cathode follower. The output from this last triode is taken from a cathode follower arrangement at 212 and is fed back to the right-hand grid of the input twin triode 206. Any difference between the input and output is amplified causing the current in the right-hand triode of the twin triode 210 to change so as to minimize the difference. Thus the input and output voltages will always be very nearly equal within the operating range of the circuit. The output voltage taken at 212 is applied across a resistor 214 to the conductor 49. The resistor 214 is a variable resistor which is set to provide a resistance analogous to $V_2-V_1$ causing the current through the resistor to be analogous to $$\frac{D_{s1}+D_{s2}-V_1(T_{up1}+T_{up2})}{4(V_2-V_1)}$$

which is, of course, the last term of Equation 3. The resistance introduced by the two meters 30 and 32 and a sampling resistor 31 connected between the two meters as will be hereinafter described is sufficiently small so as to cause no appreciable error to be introduced into the system.

From the foregoing it will be evident that the circuits described produce currents equal to all of the terms on the right-hand side of Equation 3. The algebraic sum of these currents flowing through the member 30 causes it to indicate the value of $T_{wx}$ which is the weathering correction.

As previously noted, the meter 30 has one of its terminals connected to the conductor 49 and the other of its terminals connected to one side of a resistor 31. The other side of the resistor 31 is connected to a terminal 218. The meter 32 is connected between the terminal 218 and the neutral conductor 36 by means of a reversing switch arrangement 216, shown in FIGURE 2, but not in FIGURE 5. The switch 216 is provided so as to connect the meter 32 in order that a positive deflection of the meter pointer is obtained in cases both where the resultant current flow through the meter is a flow between the neutral conductor 36 and the positive conductor 34 and when the resultant flow is between the neutral conductor 36 and the negative conductor 38.

Referring again to Equation 1, it will be noted that the total time correction is equal to the weathering time correction plus the terms set forth in the equation representing the elevation correction. The current flowing through the meter 30 provides the weathering correction and this current passes through the resistance 31 and through the meter 32. The weathering correction current, i.e., the $T_{wx}$ current, flows through the resistor 31 which is a sampling resistor and the voltage across this resistor to ground is proportional to $T_{wx}$ with some small error being introduced by the additional currents flowing in meter 32 as will be hereinafter described. In Equation 1 $T_{wx}$ is negative. Therefore, the voltage appearing across the sampling resistor 31 to ground is applied to the input of an inverting amplifier shown within the outline 220 through conductor 222. An inverting amplifier of this type is described in the abovementioned publication "Vacuum Tube Amplifiers" on page 486.

The input to the amplifier is the difference between the voltage across the sampling resistor 31 to ground and the voltage fed back from a sampling resistor 224 one side of which is connected to conductor 222 and the other side of which is connected to the neutral potential 36. The difference between these voltages is amplified to change the output current from the inverting amplifier in such a manner as to minimize the difference. If the $T_{wx}$ voltage across the resistor 31 is negative, the output from the inverting amplifier will be positive and vice versa. The output from the inverting amplifier is taken from a cathode follower arrangement through conductor 227 connected to the cathode of the right-hand triode of a twin triode 225.

A variable resistor 226 is connected between the conductor 227 and the conductor 222. This resistance 226 is adjusted to represent the value $V_1$. If the voltages across the two sampling resistors 31 and 224 are equal in magnitude, then the currents to them must be equal in magnitude and opposite in sign; the current through resistor 226 must be equal to $-T_{wx}$ and the voltage across it approximately equal to $(-T_{wx})(V_1)$. A small error is introduced by the voltage drop across the sampling resistor 224. Thus there is supplied to conductor 227 a voltage approximately equal to $(-T_{wx})(V_1)$. This potential is applied to conductor 228 through a resistor 229.

A voltage representing $D_{s3}$ is taken from a potentiometer indicated generally at 230 the coil of which is connected between the neutral conductor and the positive power conductor 34. This voltage is applied to conductor 228 through a resistor 221. Voltages analogous to the distances $H_{geo}$ and $H_{sp}$ are taken from potentiometers indicated at 234 and 232, respectively. Switching means indicated generally at 238 and 236, shown in FIGURE 2, but not in FIGURE 5, are provided to selectively connect the coils of these potentiometers between the neutral conductor 36 and either the positive potential conductor 34 or the negative potential conductor 38 depending upon whether these values are positive or negative. It will be evident that the specific location selected for the datum plane will determine the polarities of these values. The voltages selected by the potentiometers 232 and 234 are applied to the conductor 228 through resistors 233 and 235, respectively. Thus there is applied to the conductor 228 a summation of the voltages representing the values in the numerator of the second term of the Equation 1.

The potentials in line 228 are fed to a second summing amplifier shown with the outline 240. This amplifier is similar to the summing amplifier shown and described with the outline 104 with modification to the output to permit it to work over greater range and with smaller output resistance. The output stage at 242 is made a straight cathode follower with a smaller cathode resistor 241 to permit large current variations in the tube. The voltage output of the amplifier which is held equal to the input is applied across a variable resistor 244 which is adjusted to be equal to $\frac{1}{4}V_2$. The current through the resistor is then equal to $$\frac{1}{V_2}[(-T_{wx})(V_1)+D_{s3}-H_{geo}-H_{sp}]$$

which is the elevation correction. This current is delivered to the meter 32 with the current through the meter 30 and the algebraic summation of these two currents causes the meter 32 to indicate the total time correction $T_t$. As previously noted, the meter 32 is provided with a double-pole double-throw switch arrangement 216 so that it can be made to give a positive indication regardless of whether the correction is positive or negative.

Figure 3:
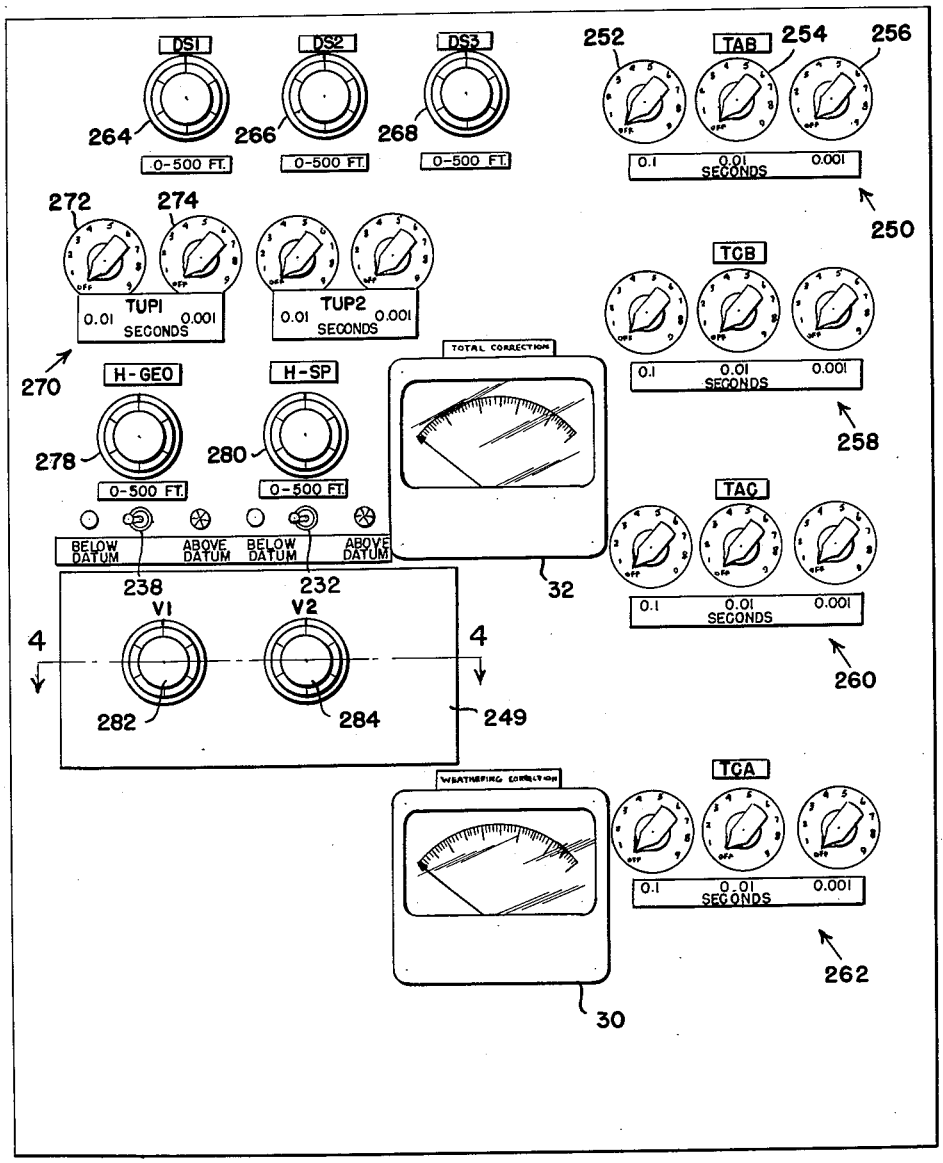
FIGURE 3 is a view showing the control panel of the computer.

In FIGURE 3 there is shown the front of a control panel 249 for the analog computer. At 250 there is indicated generally the means for setting the $T_{ab}$ value into the computer. The $T_{ab}$ setting means includes three dials 252, 254 and 256 each calibrated in steps from 1 to 9. The dial 252 is employed to set tenths of seconds and positions the selector switch 61 to select taps between the series resistors indicated at 60 in FIGURE 2. The dial 254 is employed to set one-hundredths of seconds and sets the selector switch 63 to select taps between the series resistors indicated generally at 62 in FIGURE 2. The dial 256 selects thousandths of seconds and sets the selector switch 65 to select taps between the series resistors indicated generally at 64 in FIGURE 2. The $T_{bc}$, $T_{ac}$ and $T_{ca}$ setting controls are indicated generally at 258, 260 and 262, respectively. The weathering correction meter 30 and the total correction meter 32 are the meters indicated at 30 and 32 in FIGURE 2.

The potentiometers employed for setting the depth potentials $D_{s1}$, $D_{s2}$ and $D_{s3}$ are shown at 264, 266 and 268, respectively. These dials are calibrated directly in feet.

The selector dials indicated generally at 270 provide the $T_{up1}$ resistance settings with the dial 272 positioning the selector switch 78 to select taps between the series resistors indicated at 74 in FIGURE 2 and the dial 274 positioning the selector switch 80 to select taps between the resistors indicated at 76 in FIGURE 2. The dial 272 is used to set hundredths of seconds and the dial 274 is used to set thousandths of seconds. The $T_{up2}$ dials indicated generally at 276 are similarly employed.

The potentiometers for providing the $H_{geo}$ and the $H_{sp}$ voltages are indicated at 278 and 280, respectively. These dials are calibrated directly in feet.

The velocity settings $V_1$ and $V_2$ are made by adjustment of the dials 282 and 284, respectively. It will be evident from the description in connection with the circuit diagram shown in FIGURE 2 that not only are values analogous to $V_1$ and $V_2$ required but also values analogous to $2V_1$ and $V_2-V_1$ are required. The particular analog circuit described in connection with FIGURE 2 and the control means therefor as described in connection with FIGURE 3 have the advantage in permitting adjustment of these velocity values without requiring adjustment of the distance and time value settings. Furthermore, the values $2V_1$ and $V_2-V_1$ are automatically provided upon adjustment of the two controls 282 and 284.

Figure 4:
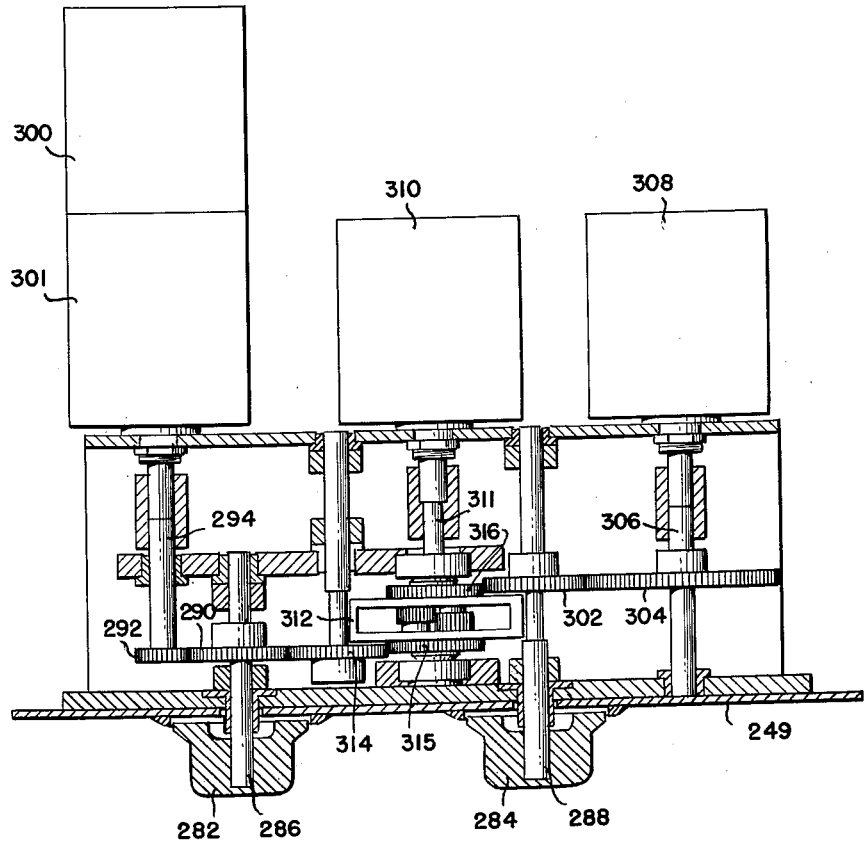
FIGURE 4 is a fragmentary section through the portion of the control panel indicated at 4—4 in FIGURE 3 showing apparatus mounted behind the control panel.

An arrangement involving differential gearing and four potentiometers is employed to provide these settings. FIGURE 4 is a section through the control panel 249 showing shafts 286 and 288 mounting the velocity setting dials 282 and 284 shown in FIGURE 2. The shaft 286 mounts a gear 290 which drives a gear 292 mounted on a shaft 94 of two multiturn potentiometers within the casings 300 and 301. These potentiometers provide the values of $V_1$ and $2V_1$. The shaft 288 mounts a gear 302 which drives a gear 304 connected to the shaft 306 of a multiturn potentiometer 308. The potentiometer 308 provides values of $V_2$. A third potentiometer 310 provides the values $V_2-V_1$ and has its shaft 311 driven from a differential gear assembly 312 which receives one power input from gear 290 through a reversing gear 314 to gear 315 and receives the other input from gear 302 to gear 316. It will be evident that this arrangement will displace the shaft 311 to a degree depending upon the value $V_2-V_1$.

From the foregoing, it will be evident that an analog computer is provided in which there is employed currents analogous to time, potentials analogous to distance, and resistances analogous to velocity. Furthermore, the computer permits the individual adjustment of time currents, distance potentials and velocity resistances and the adjustment of any one of these may be accomplished without disturbing the adjustment of the others. The analog arrangement permits the use of linearly calibrated dials and, particularly, the use of velocity settings by means of only a pair of dials which are positioned in accordance with the values $V_1$ and $V_2$, respectively.

It should be noted that, while the arrangement has been described in connection with FIGURE 1 as employing three shots in three shot holes, the detectors 22 and 23 could equally well be disposed adjacent to either the shot hole 16 or the shot hole 18 and the shot 1 or shot 2 be employed as the shot producing the records which are corrected. In this case, of course, the distances $H_{sp}$ and $D_{s3}$ would be the distances involved for the particular shot employed and the $H_{geo}$ would be the distance of the particular detector employed.

What is claimed is:

1. An analog computer comprising an electrical circuit including means providing a current source, a first meter, a first network in series with said meter and said current source, said first network including a plurality of individually adjustable variable resistance legs connected in parallel between said meter and said current source, means for selecting a potential from one of said variable resistance legs and for applying said potential to one side of a variable resistance the other side of which is connected between said meter and said variable resistance legs, and means for applying a second potential to said one side of said variable resistance, and a second meter connected in series with said first meter and a second network connected in series with said second meter, means connecting said second meter and said second network to said current source to complete the circuit, said second network including means for providing a potential proportional to the current in said first meter and for applying said potential to one side of a second variable resistance the other side of which is connected to the connection between the two meters, and means for applying a second potential to said one side of said second variable resistance.

2. An analog computer comprising an electrical circuit including means providing a current source, a first meter, a first network in series with said meter and said current source, said first network including three variable resistances in parallel arrangement connected in series with said meter, and a fourth variable resistance having one side connected between said meter and said three variable resistances and having its other side connected to a pair of resistances one of which is connected to a tap from one of the three variable resistances and the other of which is connected to a tap from a resistor connected to said current source, and a second meter connected in series with said first meter and a second network connected in series with said second meter, means connecting said second meter and said second network to said current source to complete the circuit, said second network including a sampling resistor connected in series with and between said two meters, a fifth variable resistance having one end connected between said first meter and said sampling resistor and having its other end connected to one side of a sixth variable resistance the other side of which is connected between said sampling resistor and said second meter, said one side of said sixth variable resistance also being connected to a tap from a second resistor connected to said current source.

3. An analog computer comprising an electrical circuit including means providing a source of current at positive potential, means providing a source of current at negative potential, a zero potential connection, a meter for measuring current, a first variable resistance connected between one side of said meter and one of said current sources, a second variable resistance connected between said one side of said meter and the other of said current sources, a third variable resistance connected betwen one of said current sources and a first potentiometer the other side of which is connected to said one side of said meter, a first resistance connected between one side of a fourth variable resistance and a tap from said first potentiometer, a second resistance connected between said one side of said fourth variable resistance and a tap from a second potentiometer connected between one of said current sources and the zero potential connection, the other side of said fourth variable resistance being connected to said one side of said meter, and the other side of said meter being connected to said zero potential connection.

4. An analog computer comprising an electrical circuit including means providing a source of current at positive potential, means providing a source of current at negative potential, a zero potential connection, a meter for measuring current, a first variable resistance connected between one side of said meter and one of said current sources, a second variable resistance connected between said one side of said meter and the other of said current sources, a third variable resistance connected between one of said current sources and a first potentiometer the other side of which is connected to said one side of said meter, a first resistance connected between one side of a fourth variable resistance and a tap from said first potentiometer, a second resistance connected between said one side of said fourth variable resistance and a tap from a second potentiometer connected between one of said current sources and the zero potential connection, the other side of said fourth variable resistance being connected to said one side of said meter, a second meter, a third resistor connected between said meters, a fifth variable resistance having one end connected between the first meter and said third resistor and having its other end connected to one end of a sixth variable resistor the other end of which is connected between said second meter and said third resistor, a fourth resistor having one end connected to said one end of said sixth variable resistor and having its other end connected to a tap from a second potentiometer connected between one of said current sources and the zero potential connection, and means connecting the other side of said second meter to the zero potential connection.

References Cited in the file of this patent

UNITED STATES PATENTS

| | | |
|---|---|---|
| 1,893,009 | Ward | Jan. 3, 1933 |
| 2,040,086 | Goodwillie | May 12, 1936 |
| 2,123,142 | McMaster | July 5, 1938 |
| 2,217,639 | Luhrs | Oct. 8, 1940 |
| 2,493,183 | Boghosian et al. | Jan. 3, 1950 |
| 2,595,185 | Zanderer et al. | Apr. 29, 1952 |
| 2,603,415 | Silverman | July 15, 1952 |
| 2,623,916 | Weltz | Dec. 30, 1952 |

FOREIGN PATENTS

| | | |
|---|---|---|
| 477,249 | Germany | June 4, 1929 |
| 737,888 | Germany | July 28, 1943 |